United States Patent [19]

Snell et al.

[11] Patent Number: 4,493,944

[45] Date of Patent: Jan. 15, 1985

[54] SOLDER GLASS AND ELECTRICAL DEVICE EMPLOYING SAME

[75] Inventors: Richard G. Snell, Topsfield; Fredrick A. Loughridge, Ipswich, both of Mass.

[73] Assignee: GTE Products Corporation, Stamford, Conn.

[21] Appl. No.: 568,029

[22] Filed: Jan. 4, 1984

[51] Int. Cl.³ .......................... H01T 5/00; H05K 5/06
[52] U.S. Cl. .............................. 174/50.64; 174/50.61; 313/317; 501/15; 501/22; 501/49
[58] Field of Search .................... 501/15, 22, 49; 313/317, 318; 403/179; 174/50.64, 50.61

[56] References Cited

U.S. PATENT DOCUMENTS

| | | | |
|---|---|---|---|
| 3,211,826 | 10/1965 | Holcomb et al. | 501/15 |
| 3,391,055 | 4/1965 | Veres | 428/328 |
| 3,588,315 | 6/1971 | Levand et al. | 501/15 |
| 3,645,839 | 2/1972 | Veres | 428/472 |
| 3,742,117 | 6/1973 | Levand, Jr. et al. | 174/50.64 |
| 3,973,975 | 8/1976 | Francel et al. | 501/15 |
| 4,243,735 | 1/1981 | Kobale et al. | 430/25 |
| 4,330,596 | 5/1982 | Van Assche | 428/428 |
| 4,342,943 | 8/1982 | Weaver | 252/518 |

*Primary Examiner*—George F. Lesmes
*Assistant Examiner*—William M. Atkinson
*Attorney, Agent, or Firm*—William H. McNeill; Carlo S. Bessone

[57] ABSTRACT

A solder glass comprising, by weight, about 65% $Sb_2O_3$; about 30% $B_2O_3$; and about 5% PbO. The glass is molten at about 350° C. and can be employed as a molten seal in electrical devices such as tungsten-halogen lamps.

2 Claims, 1 Drawing Figure

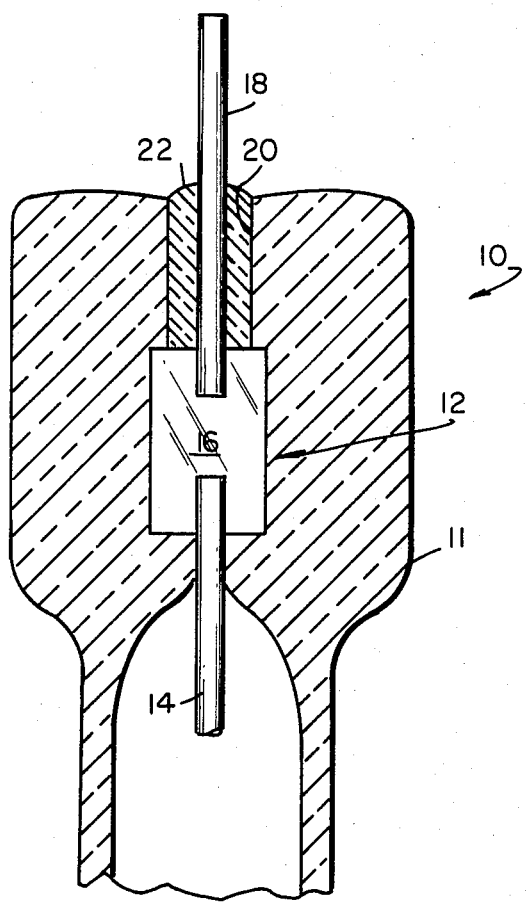

SOLDER GLASS AND ELECTRICAL DEVICE EMPLOYING SAME

TECHNICAL FIELD

This invention relates to solder glasses and more particularly to such glasses which become molten at about 350° C. and can be employed with quartz-to-metal seals in electrical devices.

BACKGROUND ART

Certain electrical devices, e.g., tungsten halogen lamps, employ envelopes comprising a high percentage of silica, such as fused silica, fused quartz or Vycor, the latter being a 96% silica glass. To achieve a hermetic seal between the glass and the lead-in conductors of the electrical device it is common practice to employ a pinch seal. The lead-in conductors generally comprise a very thin foil portion of molybdenum which forms the actual hermetic seal and an outer lead-wire portion of a refractory metal which can also be molybdenum. One end of the lead-wire is attached to the foil and the other end extends exteriorly of the pinch. This relatively heavy outer lead-wire does not form a hermetic seal with the quartz because of its relatively large diameter and the difference in thermal expansion coefficients between the two. In actual practice, because the formation of the pinch seal does not allow the quartz to flow completely around and against the full periphery of the outer lead-wire, a small capillary passage is left therebetween. The thin foil is thus exposed to atmospheric oxygen entering via the capillary passages. At elevated temperatures, say above about 350° C., oxidation of the foil can occur, resulting in breakage of the electrical connection to the outer lead-wire.

It has been suggested that this problem can be reduced by filling the capillary with a solder glass which becomes molten when the device is operated, thus forming a molten seal. Specifically, a lead borate glass has been suggested. Lead borate glasses have lead contents above 70%; however, the use of such a glass requires the use of platinum or platinum clad lead-wires since lead borate attacks molybdenum. Further, U.S. Pat. No. 3,588,315 suggests binary glasses such as antimony borate and ternary glass compositions of antimony borate with the addition of small amounts of molybdenum trioxide or tungsten trioxide.

It would be an advance in the art if additional solder glasses could be made available.

DISCLOSURE OF THE INVENTION

It is, therefore, an object of the invention to provide a solder glass having a melting temperature at about 350° C. and which is not deleterious to molybdenum.

These objects are accomplished, in one aspect of the invention, by the provision of a solder glass comprised of $Sb_2O_3$, $B_2O_3$ and PbO. This glass has the requisite melting temperature and is not deleterious to molybdenum. Thus, as a seal for electrical devices, it easily fills the capillary passages.

BRIEF DESCRIPTION OF THE DRAWINGS

The single FIGURE is a partial, sectional view, somewhat exaggerated as a size, of the end of an electrical device employing the invention.

BEST MODE FOR CARRYING OUT THE INVENTION

For a better understanding of the present invention, together with other and further objects, advantages, and capabilities thereof, reference is made to the following disclosure and appended claims taken in conjunction with the above-described drawing.

Referring now to the drawing with greater particularity there is shown a seal for an electrical device 10, which can be a tungsten-halogen lamp. Only a single end of the device 10 is illustrated, it being understood that in a double-ended device the end not shown would be similar. It is also to be understood that the invention is equally applicable to single-ended devices wherein a plurality of lead-in connectors are adjacent to one another. Device 10 has a body 11 of substantially fused silica or quartz or some other high silica content glass. By high silica content glass is meant a glass having more than 90% silica.

At least one electrically conductive member 12 is sealed in the end of device 10. The member 12 comprises a proximal portion 14 which projects within the body 11, an intermediate thin foil portion 16, as of molybdenum which forms the hermetic seal with body 11, and a distal portion 18 which projects exteriorly of the body 11.

As noted above, the formation of such a pinch seal leaves a small capillary passage 20 surrounding the distal portion 18. The passage 20 may have a width on the order of 0.001 inch.

To prevent oxidation of the foil 16 at elevated temperatures, i.e., above 350° C., the capillary passage 20 is filled with a solder glass 22. The glass 22 comprises about 65 weight percent $Sb_2O_3$; about 30 weight percent $B_2O_3$; and about 5 weight percent PbO. This solder glass becomes molten at about 350° C. and thus protects the foil 16; further, the small quantity of lead does not effect the molybdenum seal.

The glass is formulated by weighing out the antimony trioxide ($Sb_2O_3$) and the lead oxide (PbO). The boron trioxide ($B_2O_3$) is supplied from boric acid ($H_3BO_3$) at the rate of 1.776 grams of the acid for each gram of oxide desired. The materials are thoroughly mixed together and then melted. The melting is preferably carried out in a suitable crucible, such as one of kyanite ($Al_2O_3$-$SiO_2$), pure alumina or platinum with 10% rhodium. The melts can be made by introducing the batch, in small portions, into a crucible heated to about 850° C. Additional batch is added after the initial melting reaction begins until the crucible is full. The melts were made in air. The melt is held at the melting temperature of 850° C. for about fifteen minutes after it appears batch free and is then stirred with a fused quartz rod. The temperature is then lowered about 50° C. and held for about fifteen minutes and the melt is then cast into thin rods or washers. Alternatively, the viscosity of the melt could be controlled and rods drawn directly from the crucible.

The solder glass so made can be applied to the seal by positioning the device 10 vertically with the capillary to be filled uppermost. The body 11, at the seal area, is heated and the solder glass is applied thereto and caused to run down into the capillaries. If the device is double-ended, it is then inverted and the procedure repeated.

While there have been shown what are at present considered to be preferred embodiments of the invention, it will be apparent to those skilled in the art that various changes and modifications can be made herein without departing from the scope of the invention as defined by the appended claims.

We claim:

1. A solder glass comprising, by weight; about 65% $Sb_2O_3$; about 30% $B_2O_3$; and about 5% pbO.

2. A seal for electrical devices comprising a body of substantially fused silica and at least one electrically conductive member sealed therein, said member comprising a proximal portion projecting within said body, an intermediate thin foil portion hermetically sealed within said body, and a distal portion projecting exteriorly of said body, and a capillary passage surrounding said distal portion and extending to said intermediate portion, said capillary passage being substantially filled with a solder glass comprising: about 65 weight percent $Sb_2O_3$; about 30 weight percent $B_2O_3$; and about 5 weight percent PbO.

* * * * *